United States Patent [19]

Monaghan

[11] 4,399,544
[45] Aug. 16, 1983

[54] HIGH TEMPERATURE ELECTRONIC FURNACE APPARATUS AND METHODS OF OPERATION

[75] Inventor: George J. Monaghan, Wayne, Pa.

[73] Assignee: Energy Fibers Int'l. Corp., Niagara Falls, N.Y.

[21] Appl. No.: 303,172

[22] Filed: Sep. 17, 1981

Related U.S. Application Data

[63] Continuation of Ser. No. 163,489, Jun. 27, 1980, abandoned.

[51] Int. Cl.³ .......................... C03B 5/02; H05B 3/60
[52] U.S. Cl. ........................................ 373/35; 373/40
[58] Field of Search ...................... 373/27, 29, 39, 40, 373/41, 35, 120, 135, 33

[56] References Cited

U.S. PATENT DOCUMENTS

| | | |
|---|---|---|
| 1,889,516 | 11/1932 | McIntosh . |
| 2,008,495 | 7/1935 | Ferguson . |
| 2,018,886 | 10/1935 | Ferguson . |
| 2,223,047 | 11/1940 | Ramseyer . |
| 2,276,295 | 3/1942 | Ferguson . |
| 2,317,895 | 4/1943 | Drill . |
| 2,319,666 | 5/1943 | Drill . |
| 2,711,435 | 6/1955 | Humphrey . |
| 2,817,695 | 12/1957 | Hartwig . |
| 2,866,838 | 12/1958 | Paxton . |
| 2,961,698 | 11/1960 | Rea . |

OTHER PUBLICATIONS

Humphreys, et al., A Promising Possibility: Production of Mineral Wool from Coal-Ash Slag, Coal Research Bureau Technical Report No. 20.
Lawrence, Mineral Wool Production from Coal-Ash-a Progress Report Coal Research Bureau Technical Report No. 38.
Humphreys, et al., Production of Mineral Wool Insulating Fibers from Coal Ash Slag and Other Coal Derived Waste Materials, Coal Research Bureau Technical Report No. 53.

Primary Examiner—Roy N. Envall, Jr.
Attorney, Agent, or Firm—Finnegan, Henderson, Farabow, Garrett & Dunner

[57] ABSTRACT

A high temperature electronic furnace wherein a product-containing vessel has a product exit orifice, a plurality of electrodes are located in the vessel to define primary current paths adjacent the orifice, a control electrode is positioned in the vessel for defining an additional current path adjacent the orifice and a circuit for energizing the primary electrodes with multiphase current and for time-sharing the multiphase current with the control electrode. The degree of time-sharing is made responsive to the temperature of product passing through the orifice and/or the rate of flow of product passing through the orifice. In addition, the control electrode is moveably positioned with respect to the orifice, with the position of the control electrode being dependent upon the temperature of product passing through the orifice and/or the rate of flow of product through the orifice. The invention also includes a method for controlling the melting of product wherein primary electrodes of a furnace are sequentially electronically replaced by a control electrode.

24 Claims, 10 Drawing Figures

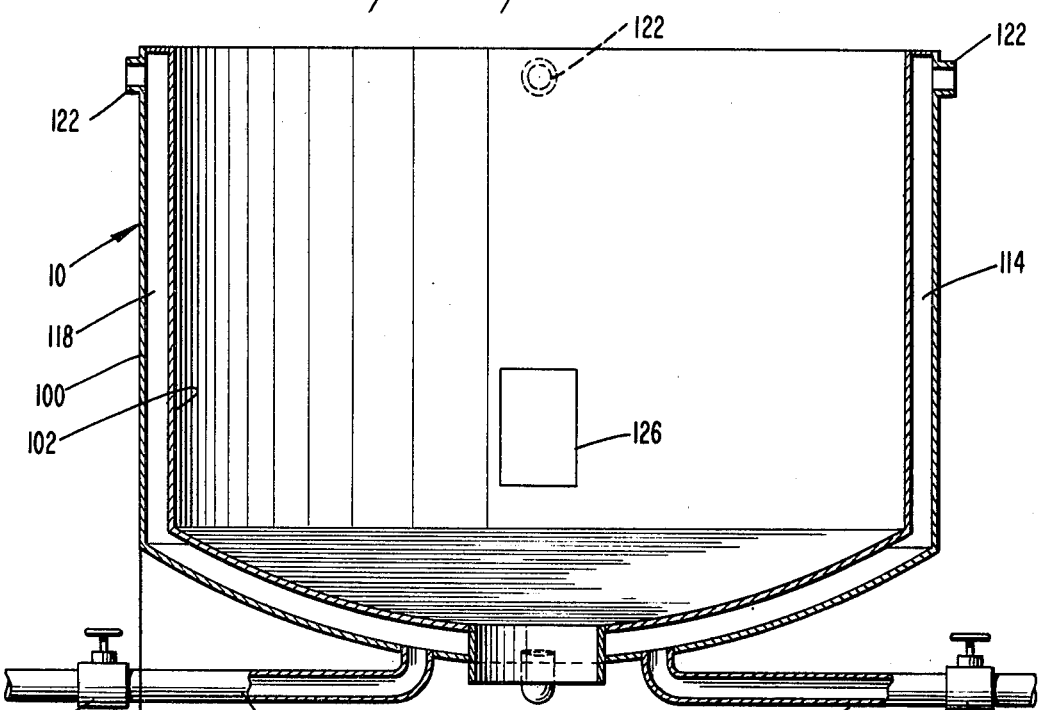
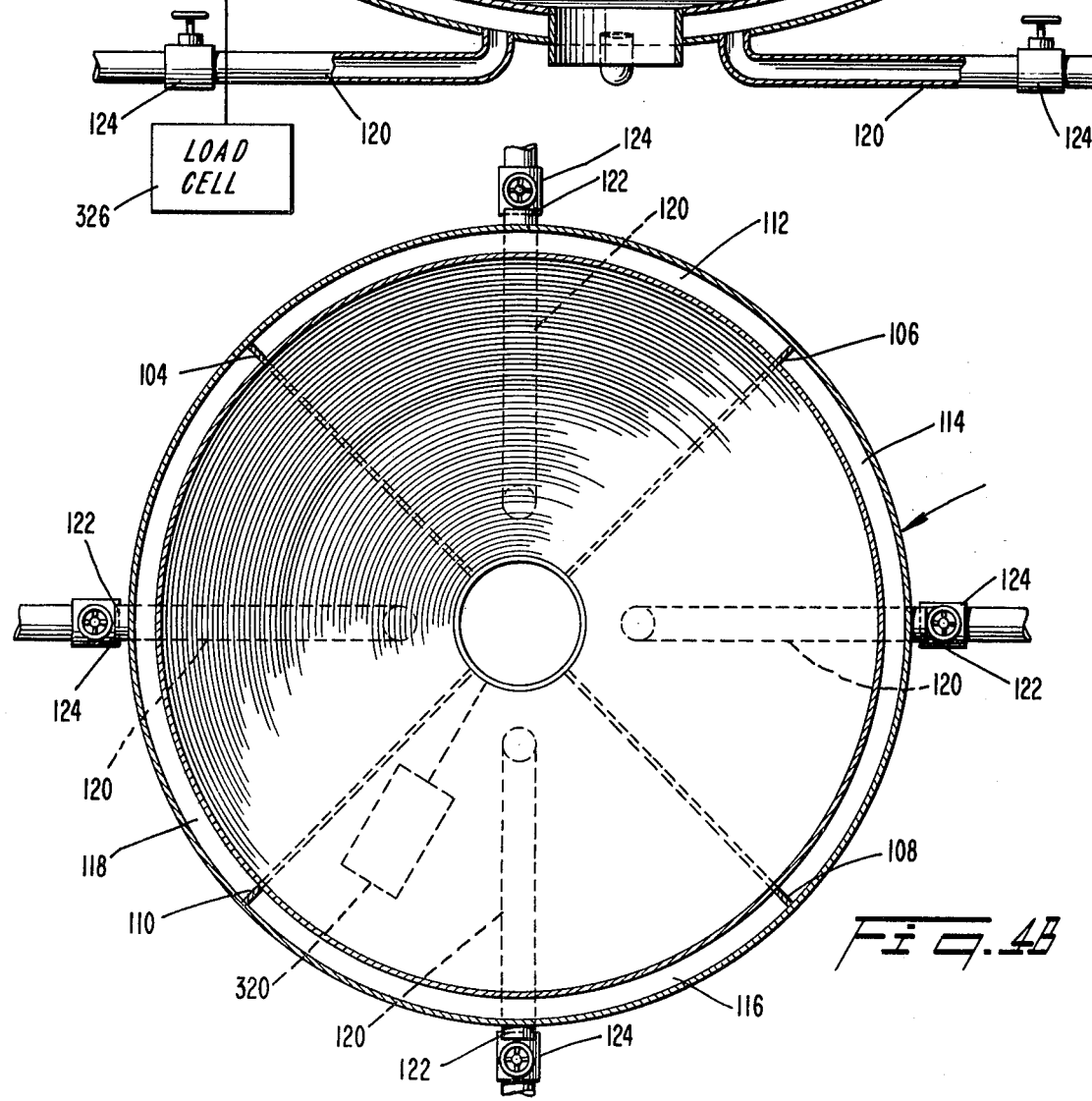

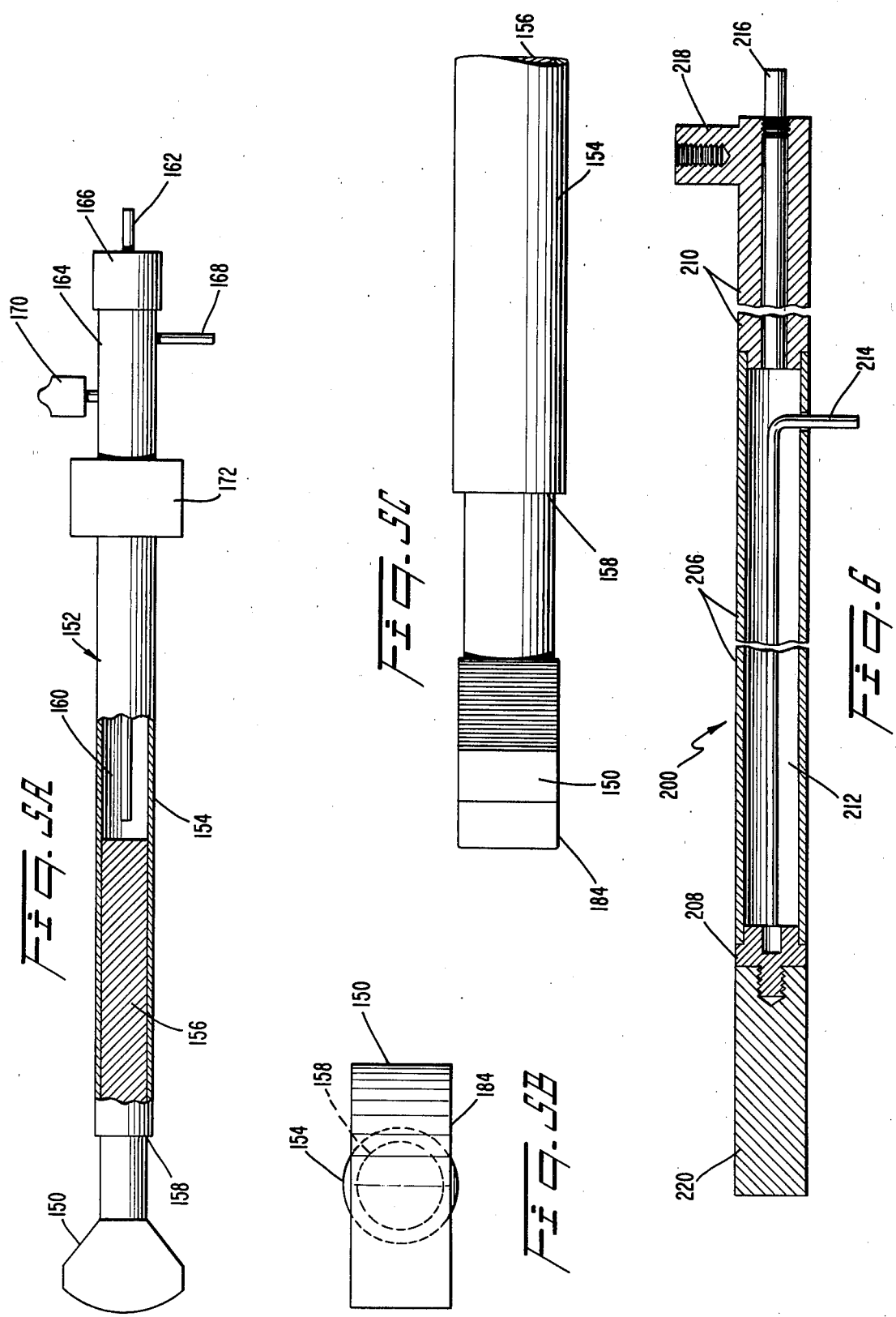

HIGH TEMPERATURE ELECTRONIC FURNACE APPARATUS AND METHODS OF OPERATION

This is a continuation of application Ser. No. 06/163,489, filed June 27, 1980, now abandoned.

BACKGROUND OF THE INVENTION

I. Field of the Invention

The present invention relates to a high temperature electronic furnace suitable for converting fly ash into mineral wool.

Mineral wool is a fine fibrous "wool-like" material, typically made by blowing a small stream of molten rock or similar material, such as coal ash, with a jet or stream of fluid. The action of the jet of fluid blows the mineral stream into fine fibrous material which hardens before the fibers reach the floor.

The manufacturing process requires that the fly ash be melted and poured within critical temperature and pour rate tolerances. For example, fly ash typically melts and pours at around 2765 degrees Fahrenheit. However, at this temperature, the fly ash is a gummy mass, whereas at 2875 degrees Fahrenheit the fly ash flows like water. Moreover, the diameter of the resultant fibrous strains is highly dependent upon the temperature of the molten fly ash. Accordingly, it is essential that any furnace used to melt fly ash for the production of mineral wool have the capacity to control the temperature of the fly ash to precise tolerances, on the order of 5 to 10 degrees centigrade while processing large continuous volumes of fly ash—on the order of 40,000 lbs/hr for weeks at a time. However, no known prior art furnace has this degree of control over the temperature of high volume molten fly ash.

II. Description of the Prior Art

In the past, attempts have been made to utilize electronic furnaces to melt fly ash and produce mineral wool. For example, U.S. Pat. No. 2,817,695 issued to Hartwig discloses an electronic furnace and electrode structure designed for the melting of refractory materials such as mineral wool. Hartwig employs three main electrodes spaced 120 degrees from one another in a plane. A nozzle assembly is moveably positioned along a line perpendicular to the plane of the main electrodes at the center point of the three electrodes. The nozzle assembly is cooled below oxidation temperature by coolant flow in a nozzle support assembly.

Hartwig recognizes the need to provide accurate temperature control and attempts to accomplish this control by cooling the nozzle assembly and by supplying heat to the nozzle in accordance with temperature measurement of melted product passing through the nozzle assembly. Hartwig suggests that one way of achieving the requisite control is to apply an electrical potential between the nozzle and a selected one of the main electrodes to effect resistive heating of the melted product at the nozzle. However, except for stating that auxiliary power to the nozzle is turned on after the nozzle assembly has been properly positioned, Hartwig provides no teaching of how the suggested resistive heating of the melted product adjacent the nozzle is to be accomplished. Instead, Hartwig concentrates on the structure of coolant passages in the nozzle assembly.

U.S. Pat. No. 3,147,328 issued to Le Clerc deBussy discloses an electric glass making furnace which employs: three primary electrodes angularly spaced 120 degrees apart in a plane; a first conductive disc positioned along a line perpendicular to the plane of the main electrodes and which passes through the center of the three primary electrodes, and with the first disc having a passageway through which melted glass may pass out of the vessel; a plurality of auxiliary starting electrodes located above the plane of the three primary electrodes and moveably positioned adjacent the opening of the passageway in the first disc; and a second disc moveably positioned along the above-mentioned line of the first disc to form a slot between the first and second discs which slot is substantially on the same plane as the median plane of the primary electrodes.

In operation of the Le Clerc deBussy device, with the second disc in a separated position, the starting electrodes are moved together three centimeters from each other adjacent the opening of the passageway in the first disc, and are electrically energized to melt glass adjacent the first disc. The glass between the starting electrodes is also heated with a blow pipe. The starting electrodes are withdrawn as the glass begins to melt and the primary electrodes are energized. When the glass adjacent the first disc is in a liquid state, the second disc is brought into position above the first disc and is also supplied with electrical energy.

According to Le Clerc deBussy, in the course of normal operation, a major part of the current in the primary electrodes travels from a primary electrode through the glass, from the glass to the two discs, and then to the glass and finally to another primary electrode. The electrical circuit diagram supplied with Le Clerc deBussy shows the primary electrodes to be energized by a three-phased current source, and shows the first and second discs to be energized by single-phase current drawn from the main three-phase power supply.

Le Clerc deBussy recognizes that the hottest region in the molten glass is created between the two discs and the primary electrodes. However, the electrical and mechanical configuration of Le Clerc deBussy does not provide control of temperatures adjacent the passageway which would be sufficient to provide for high volume melting of fly ash is required in a high volume mineral wool manufacturing process. Instead, according to Le Clerc deBussy, only a small stream of glass is pulled through the slit between the two discs and sucked through the passageway of the first, lower, disc.

Other examples of electronic furnaces are provided by U.S. Pat. Nos. 3,876,817 and 3,659,029 also issued to Le Clerc deBussy and by U.S. Pat. No. 3,983,309 issued to Faulkner et al. However, none of these additional patents teaches a furnace arrangement or method of operation which provides for the required amount of temperature control to accomplish large scale melting of fly ash.

It is, therefore, an object of the present invention to provide a furnace and method of operation which can effectively convert large quantities of fly ash into mineral wool.

Another object of the present invention is to provide a furnace and method of operation which permits large scale conversion of fly ash into mineral wool through the use of multiphase electric current;

A further object of the present invention is to provide an electronic furnace and method which is capable of electronically generating a large amount of heat at a precisely controlled temperature over an exit orifice of a melting vessel in order to permit large amounts of fly ash immediately over that orifice to be raised to a precise temperature and to permit controlled flow of that fly ash through the orifice to produce large quantities of mineral wool.

Additional objects and advantages of the invention will be set forth in part in the description which follows, and in part will be obvious from the description or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a melting furnace is provided which comprises: (a) a vessel for receiving product to be melted, the vessel having a product exit orifice; (b) a plurality of primary electrodes for defining primary current paths adjacent the orifice; (c) a control electrode means for defining a current path to the orifice; and (d) a circuit means for energizing the primary electrodes with multiphase current and for time-sharing the multiphase current with the control electrode.

It is preferable that the vessel include a nozzle which defines the product exit orifice, the nozzle having an upper surface which contains the orifice, a channel having a smaller internal diameter than the orifice which channel extends through the nozzle, and a conical indent on the upper surface which couples the orifice to the channel. The nozzle preferably further includes a lower surface opposite the upper surface having an opening to the channel, the opening being surrounded by a convex proturberance of the lower surface. It is also preferable that the circuit for energizing the primary electrode and for time-sharing the multiphase current with the control electrode also provides a return path for the multiphase current through the nozzle.

In a more narrow sense, the present invention contemplates a melting furnace comprising: (a) a vessel for receiving product to be melted, the vessel having in a lower portion thereof a nozzle which contains an upper surface, and a product exit orifice in the upper surface through which melted product may pass out of the vessel; (b) first, second and third primary electrodes for defining primary current paths between the electrodes to heat product adjacent the orifice, with the primary current paths and orifice lying in the same plane; (c) a control electrode having an electrically conductive surface located within the vessel on a line which is both perpendicular to the plane and passes through the orifice, the electrically conductive surface of the control electrode being moveable along that line; and (d) a circuit for sequentially replacing each primary electrode electronically with the control electrode.

It is preferable that the above-mentioned circuit for sequentially replacing each primary electrode electronically with the control electrode includes the capacity for controlling the replacement of each primary electrode in response to the temperature of the product passing through the orifice and/or in response to the rate of flow of product through the orifice. That circuit also preferably further includes the capacity for altering the position of the control electrode in response to the temperature of product passing through the orifice and/or in response to the rate of flow of product through the orifice.

The furnace contemplated by the present invention in a preferred embodiment further includes the capacity for altering the position of melted product adjacent to the orifice. This capacity is preferably achieved by providing inner and outer side walls to form the vessel, and providing a plurality of fluid flow passages in the side walls of the vessel for cooling selective portions of the vessel. These fluid flow passages are positioned vertically adjacent one another in the side walls of the vessel. Accordingly, selective control of the rate of coolant flow through the fluid flow passages affects the positioning of melted product adjacent the orifice.

It is also contemplated to be within the scope of the present invention to provide a method for controlling the melting of product in a vessel having a nozzle which defines a product exit orifice, a plurality of primary electrodes which define primary current paths adjacent the orifice, and a moveable electrode, comprising the steps of: (a) energizing the primary electrodes with sufficient multiphase current to maintain a pool of melted product adjacent the orifice; (b) positioning the moveable electrode closer to the orifice than any of the primary electrodes; and (c) sequentially replacing each primary electrode electronically with the moveable electrode.

The above-mentioned method also preferably includes the steps of regulating the replacement of each primary electrode in accordance with the temperature of product passing through the orifice, varying the positioning of the moveable electrode in response to the temperature of product passing through the orifice; regulating the replacement of each primary electrode in accordance with the rate of flow of product through the orifice; and/or controlling the positioning of the moveable electrode in response to the rate of flow of product through the orifice.

The method of the present invention further preferably includes the step of melting solidified product in the orifice of the nozzle by moving the moveable electrode adjacent to the orifice, and supplying electrical current between the moveable electrode and the nozzle sufficient to melt the product in the orifice. The method further preferably includes the step of terminating the flow of melted product through the orifice by withdrawing the moveable electrode from the vicinity of the orifice. The step of terminating the flow of melted product also includes the step of increasing the coolant flow adjacent the nozzle.

BRIEF DESCRIPTION OF THE DRAWINGS

The accompanying drawings which are incorporated and constitute a part of the specification, illustrate a preferred embodiment of the invention and, together with the general description of the invention given above and the detailed description of the preferred embodiment given below, serve to explain the principles of the invention.

FIGS. 4A and 4B provide a sectioned side view, and a top view of a vessel incorporating the teachings of the present invention;

FIGS. 5A, 5B, and 5C provide a top view, end view, and side view, of a primary electrode in accordance with the teachings of the present invention;

FIG. 6 provides a side view of a control electrode in accordance with the teachings of the present invention; and FIG. 7 provides an electrical diagram of a control circuit incorporating the teachings of the present invention.

The above general description and the following detailed description are merely illustrative of the generic invention and additional modes, advantages, and particulars to this invention will be readily suggested to those skilled in the art without departing from the spirit and scope of the invention.

DESCRIPTION OF THE PREFERRED EMBODIMENT

Reference will now be made to the present preferred embodiment of the invention as illustrated in the accompanying drawings.

Figure 1:
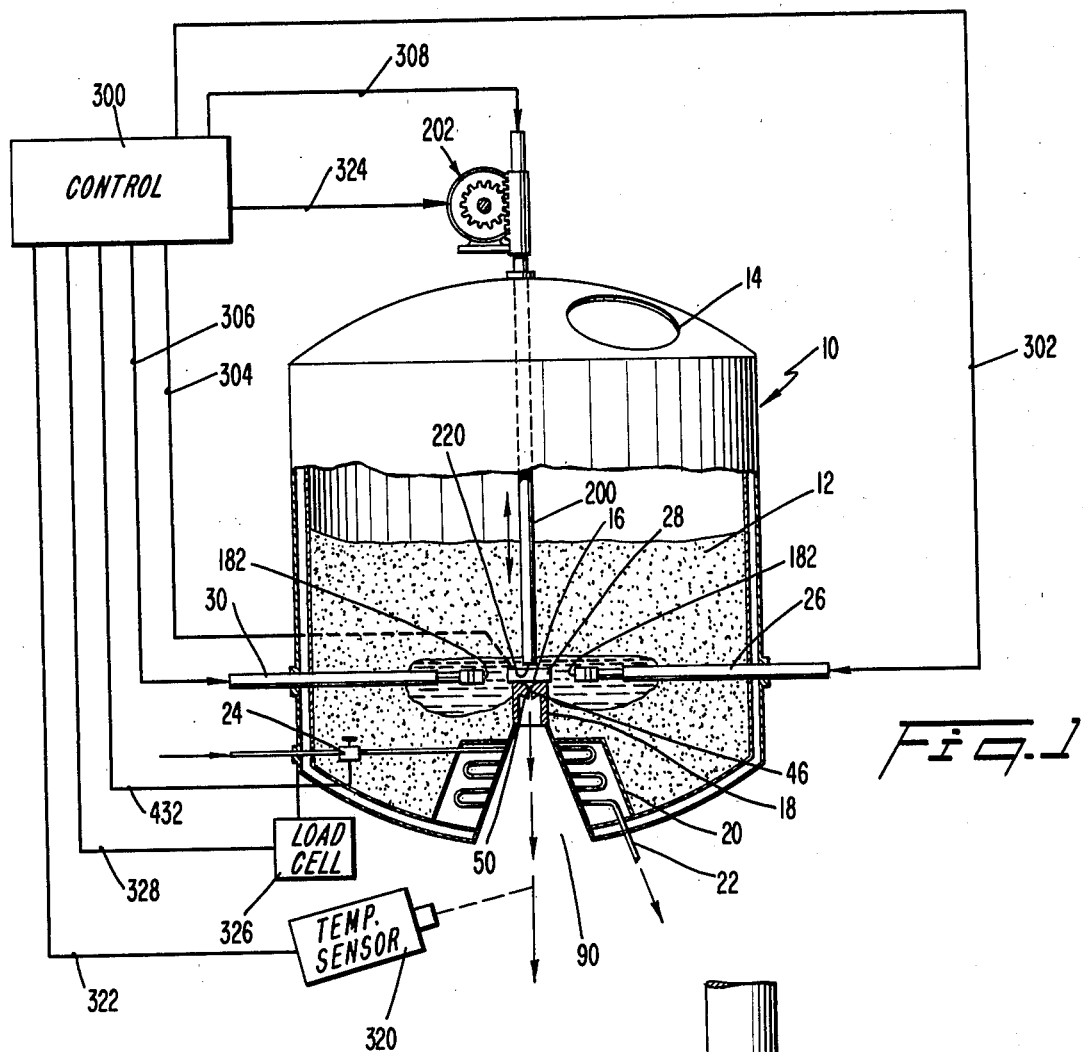
FIG. 1 schematically illustrates a melting furnace incorporating the teachings of the present invention.

In FIG. 1 there is schematically shown a vessel 10 for receiving product 12 to be melted, such as fly ash. The fly ash is introduced into vessel 10 through an opening 14 at the top of the vessel. A second opening or product exit orifice 16 is located near the bottom of the vessel to permit melted product to exit the vessel. More specifically, orifice 16 is formed in a nozzle 18, which nozzle is in turn mounted on a nozzle assembly 20. A cooling mechanism 22 is provided within nozzle support 20 and is controlled by a nozzle coolant valve 24. First, second and third primary electrodes 26, 28, and 30 are shown positioned within vessel 10 to surround orifice 16.

A more detailed description of vessel 10, nozzle 18, nozzle support 20, and primary electrodes 26, 28 and 30 is provided below with respect to FIGS. 2-5.

Figure 2:
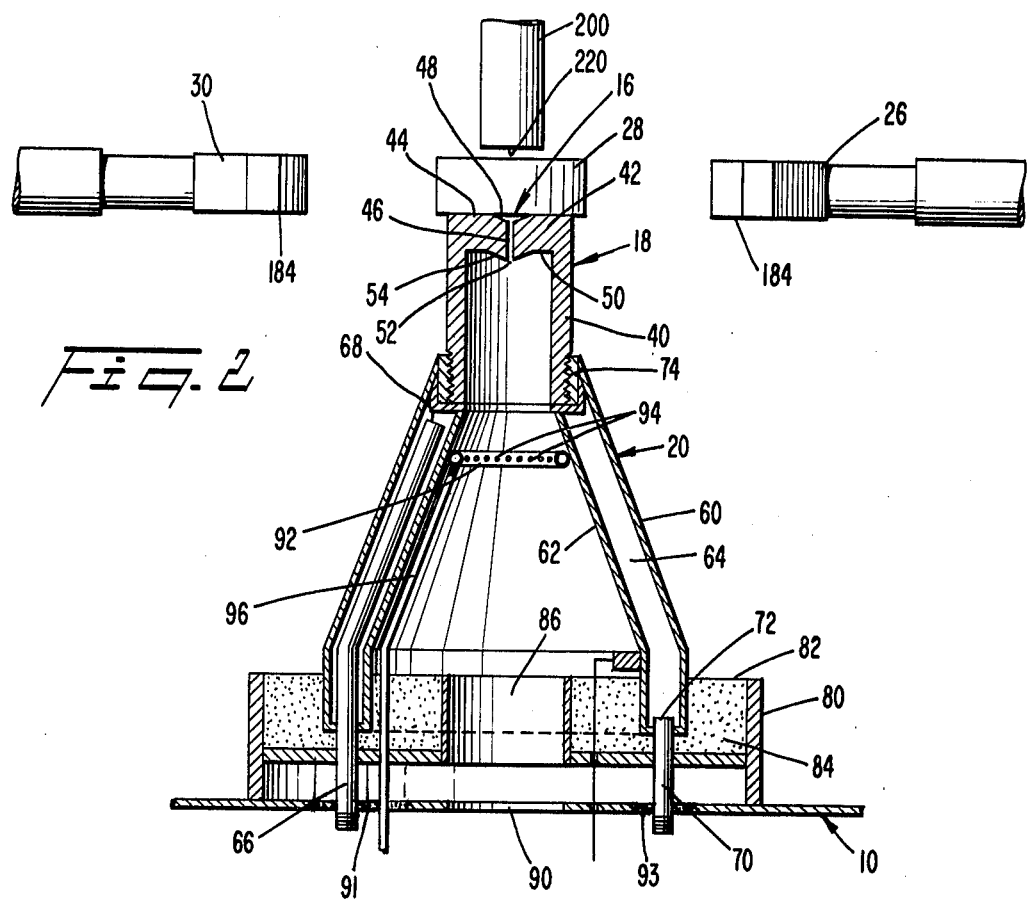
FIG. 2 is a cross-sectional view of a nozzle and nozzle support incorporating the teachings of the present invention.
Figure 1:
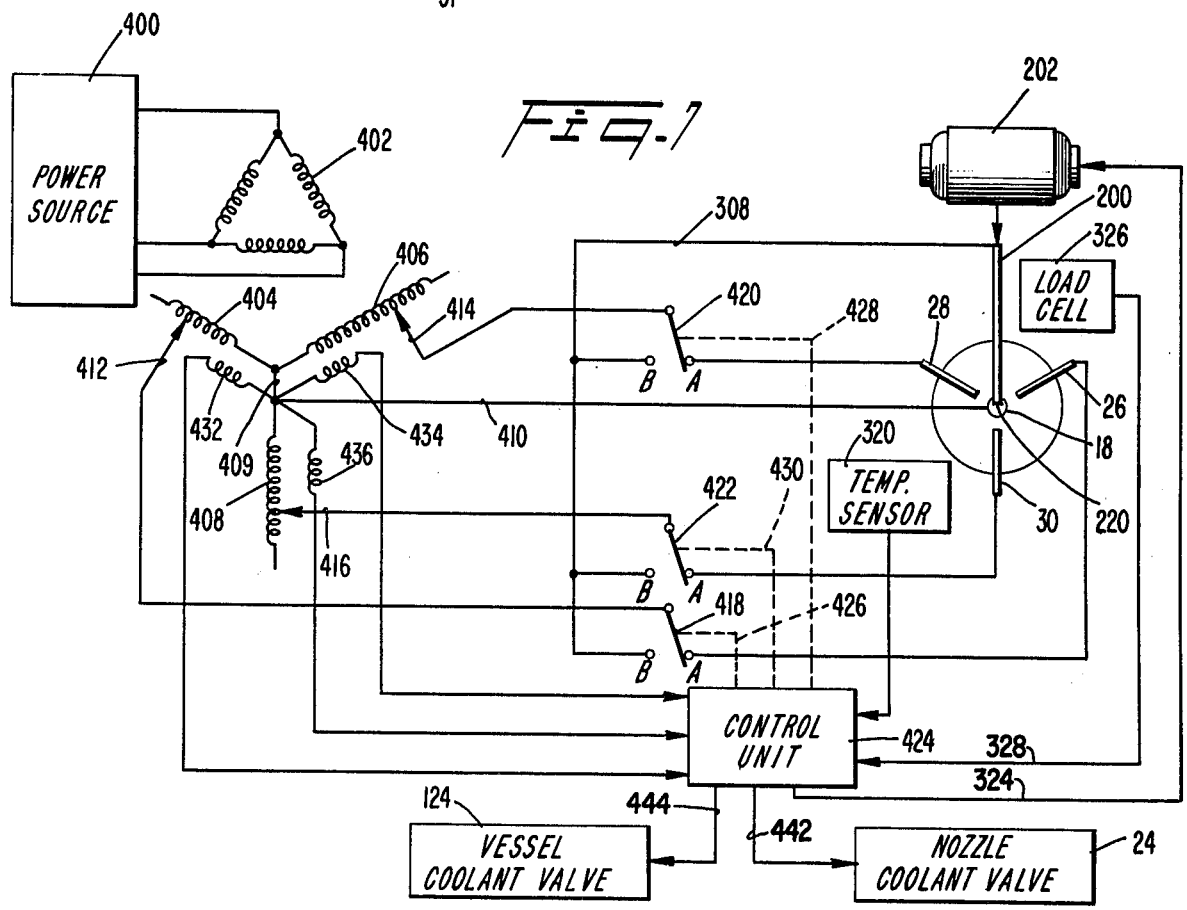

FIG. 2 shows a cross-sectional view of nozzle 18 and nozzle support 20. More specifically, nozzle 18 comprises a hollow cylinder 40 preferably constructed of molybdenum which is capable of withstanding exposures to melted product up to about 4700 degrees Fahrenheit. If the temperatures of melted product adjacent orifice 18 is intended to exceed 4700 degrees Fahrenheit, then orifice 18 may be fabricated of graphite. The top of cylinder 40 is closed with a plug 42 also made of molybdenum. Cylinder 40 and plug 42 preferably comprise a single integral structure. Plug 42 has an upper surface 44 which contains orifice 16. A channel 46 passes through plug 42 which channel has a smaller internal diameter than the diameter of orifice 16 and which channel extends through plug 42 to the interior of cylinder 40. A conical indent 48 on upper surface 42 couples orifice 16 to channel 46.

Plug 42 of nozzle 18 further includes a lower surface 50 opposite upper surface 44 and having an opening 52 to channel 46. Opening 52 is surrounded by a convex proturbance 54 of lower surface 50.

The diameter of channel 46 is preferably on the order of two and one half inches to accommodate a flow rate of 40,000 lb/hr. of melted fly ash. The length of channel 46 is preferably six times greater than the diameter of channel 46. The long length of channel 46 and the upper angle created by conical indent 48 cause a stream of melted product to stabilize as the product flows through nozzle 18. The convex proturbance 54 on lower surface 50 prevents the melted material from splashing or wicking to the side of nozzle support 20 upon exit from nozzle 18.

Nozzle support 20 is preferably made of copper, stainless steel, or black iron. Support 20 comprises an outer conical wall 60, and an inner conical wall 62 which forms a watertight compartment 64 therebetween. Pipe 66 extends into compartment 64 and terminates at end 68 adjacent nozzle 18. A second pipe 70 also extends into compartment 64, and terminates at end 72 near the lower portion of nozzle support 20. Accordingly, coolant such as water may enter compartment 64 through pipe 66 and exit compartment 64 through pipe 70. Nozzle 18 is mounted in electrical contact, and heat conducting contact with nozzle support 20 by means of threads 74 to the upper end of support 20 and is therefore cooled in accordance with the temperature of support 20.

Nozzle support 20 is mounted to the base of vessel 10 by support 80. Support 80 includes a circular channel 82 dimensioned to receive the lower end of support 20. Channel 82 is filled with insulating cement 84 of high alumina no. 22, to maintain electrical isolation between the electrical combination of nozzle 18 and support 20, and the walls of vessel 10. Base 82 contains a centered circular opening 86. Opening 90 in the base of vessel 10 permits melted product to pass from the interior of nozzle support 20, through opening 86 of base 80, to the exterior of vessel 10. Insulators 91 and 93 are also provided in the vessel of nozzle 10 to electrically isolate pipes 66 and 70 from vessel 10.

To protect nozzle 18 from oxidation, the interior of nozzle support 20 may be flooded with an inert gas such as nitrogen. Specifically, a ring spray valve 92 may be positioned in the interior circumference of support 20, and contain openings 94 for release of nitrogen in the direction of nozzle 18. A supply pipe 96 is provided to deliver nitrogen to spray nozzle 84.

FIGS. 4A and 4B show a preferred configuration of vessel 10, having exterior side walls 100 and interior side walls 102 of vessel 10. Baffles 104, 106, 108 and 110 extend vertically up the sides of vessel 10 to divide the opening between side walls 100 and 102 into four separate fluid-tight compartments 112, 114, 116, and 118. Each compartment 112–118, has its own input port 120, and its own exit port 122. Vessel coolant valves 124 control the flow of coolant into input ports 120. Thus each compartment 112–118 is positioned vertically adjacent another in the side walls of vessel 10, and, through the independent operation of valves 124, each compartment provides an independent means for cooling a particular vertical quadrant of vessel 10.

In FIG. 4A, an opening 126 is shown through the side of vessel 10 which receives one of primary electrodes 26, 28, or 30.

FIGS. 5A–5C illustrate a preferred embodiment of primary electrodes 26, 28 and 30. The primary electrodes each include a fan-shaped tip 150 which is made out of molybdenum or graphite. Tip 150 is supported by an electrode assembly 152 which includes a heavy wall, hollow pipe 154 constructed of stainless steel, copper, or black iron. Tip 150 has a cylindrical portion 156 which slides into first end 158 of pipe 154 and is held rigidly in place by pipe 154. The remaining portion 160 of the interior of pipe 154 is hollow. A fluid input pipe 162 extends from the extreme end 164 of pipe 154 opposite tip 150 into interior section 160. Fluid input pipe 162 terminates adjacent the beginning of cylindrical portion 156 of tip 150. A pipe cap 166 permits insertion of pipe 162 into the interior of pipe 154 and seals end 164 of pipe 154. Outlet pipe 168 is inserted through the side walls of pipe 154 adjacent cap 166 and provides an exit for coolant introduced into interior space 160 through pipe 162.

A pressure valve 170 also communicates through the walls of pipe 154 to interior passage 160 to provide a release escape in the event any steam pockets build up within the interior of the electrode.

An insulation block 172 surrounds pipe 154 and permits electrically insulative mounting of the primary electrodes into vessel 10.

Figure 3:
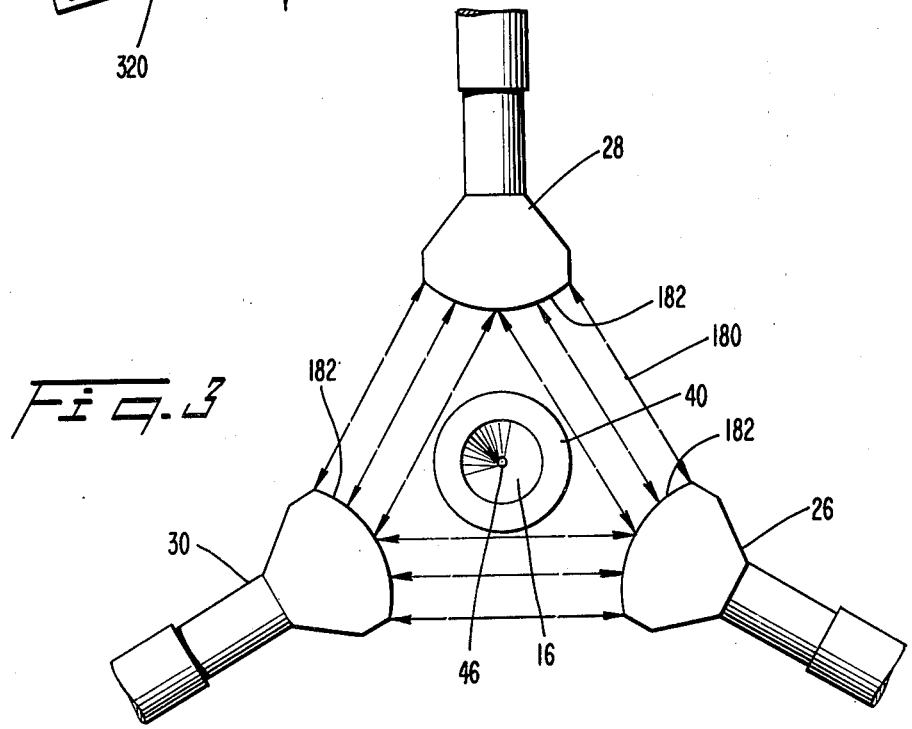
FIG. 3 is a top view of a schematic illustration of the positioning of primary electrodes in accordance with the teachings of the present invention.

As can best be seen from FIGS. 2 and 3, primary electrodes 26, 28 and 30 are positioned to define primary current paths 180 that portion of nozzle 18 which defines product exit orifice 16. Preferably, conductive surfaces 182 of electrodes 26, 28 and 30 are convexed in shape, and are positioned to tend to equalize the length of primary current paths 180 between adjacent primary electrodes 26, 28 and 30.

As may best be seen from FIG. 2, the bottom surface 184 of tips 150 lies generally in the same plane as upper surface 44 of nozzle 18 in which orifice 16 is defined. Thus, primary current paths 180 between electrodes 26, 28 and 30 also lie substantially in the same plane at upper surface 44. This orientation of electrodes 26, 28 and 30 helps to assure that a pool of melted product will lie immediately above orifice 16.

In accordance with the present invention there is provided control electrode means for defining a current path to the means which defines the product exit orifice. For example as illustratively shown, in FIG. 1 a control electrode 200 is provided having an axis position collinear with the axis of channel 46 in nozzle 16. Control electrode 200 is mounted to be moveable along its longitudinal axis by means of a motor, hydraulic lift, or other control mechanism schematically shown by motor 202 in FIG. 1.

A more detailed diagram of a preferred embodiment control electrode 200 is shown in FIG. 6. As illustrated in FIG. 6, solid cylindrical electrode tip 204 is provided at one end of electrode 200. Tip 204 is preferably constructed of molybdenum or graphite, depending upon the temperature of the bath which tip 204 must sustain. A hollow support pipe 206 is provided to hold electrode 204 in a desired position. A threaded stud 208 is provided at one end of support pipe 206 for attaching electrode tip 204 to support pipe 206. An electrically conductive pipe cap 210 is provided at the opposite end of support pipe 206 from tip 204. The interior of support pipe 206 between threaded stud 208 and pipe cap 210 forms a hollow fluid-tight passage 212. An input coolant pipe 214 is inserted through a wall of pipe 206 and terminates in interior passage 212 near threaded stud 208. An exit path is provided from passage 212 through exit pipe 216 positioned coincident with the longitudinal axis of pipe cap 210. An electrical connector 218 is also coupled to pipe cap 210 to provide electrical access to electrode 200.

Further in accordance with the present invention, there is provided circuit means for energizing the primary electrode means with multiphase current and for time-sharing the multiphase current with the control electrode means.

As illustratively shown in FIG. 1, there is provided a control circuit 300 which provides over lines 302, 304, and 306, three phase current to primary electrodes 26, 28 and 30 respectively. A line 308 electrically connects control circuit 300 to control electrode 200. As will be explained in more detail in connection with FIG. 7, control circuit 300 operates to time-share the multiphase current supplied over lines 302, 304, and 306 with the control electrode 200 over line 308. More specifically, control circuit 300 operates to sequentially replace each primary electrode 26, 28 and 30, with control electrode 200. When so replaced, the current intended for primary electrode 26, 28 or 30 instead passes through control electrode 200. This creates an electrically imbalanced load which causes generation of an additional current path from control electrode 200 to nozzle 18. This additional control path increases the temperature of product adjacent the additional current path in the vicinity of orifice 16. The control of current through this additional current path provides a vehicle for precisely regulating the temperature of product adjacent orifice 16. The greater the amount of time control electrode 200 is electrically positioned in place of one primary electrode 26, 28 or 30, the greater the amount of current in the additional current path adjacent orifice 16.

Preferably, the amount of time-sharing permitted by control circuit 400 is dependent upon the temperature of product passing through orifice 16. The temperature of product passing through orifice 16 is, in turn, determined by temperature sensor 320 which is positioned below opening 90 of vessel 10. Temperature sensor 320 may, for example, comprise a device commercially identified by the name Williamson Temperature Control. The output of temperature sensor 320 is coupled by line 322 to an input of control circuit 300.

The amount of time-sharing by control electrode 200 may also be varied depending upon the rate of flow of product through orifice 16. To determine the rate of flow of product through orifice 16 one or more load cells 326 continuously measure the weight of vessel 10 and transmit a signal indicating that weight over line 328 to control circuit 300. The signal over line 328 is, therefore, indicative of the rate of flow of product through orifice 16.

The physical distance between conductive surface 220 at the end of control electrode 200 and orifice 16 also affects current flow adjacent orifice 16. The closer conductive surface 220 is to orifice 16, the greater the temperature of product adjacent orifice 16 for a given amount of current. The distance between conductive surface 200 and orifice 16 is controlled by an output signal from control circuit 300 delivered over line 324 to motor 202.

Accordingly, control circuit 300 governs the position of conductive surface 220 of control electrode 200 as a function of the temperature of the product passing through orifice 18 as determined by temperature sensor 320, and/or as a function of the rate of flow of product through orifice 16 as determined by the operation of load cell 326.

A schematic diagram of control circuit 300 is provided in FIG. 7. As shown in FIG. 7, a multiphase power source 400 is coupled to a delta configuration multiphase transformer 402. Secondaries 404, 406, and 408 of power transformer 402 are connected in a wye configuration. The common point 409 of the wye configuration of secondaries 404, 406, and 408 is coupled by line 410 to nozzle 18 to provide a return current path for current passing through control electrode 200. Variable position taps 412, 414, and 416, are coupled through switches 418, 420, and 422, respectively, to primary electrodes 26, 28, and 30. With switches 418, 420 and 422 in position A, secondaries 404, 406, and 408 are coupled respectively to primary electrodes 26, 28 and 30. Although switches 418, 420 and 422 are illustratively shown to be double-throw, single-pole switches, they may in fact comprise portions of a high power SCR switching circuit such as the Hallman Model No. PA-1, which may be opened or closed depending upon the signals generated by control unit 424 over lines 426, 428, and 430, respectively.

Switches 418, 420 and 422 are shown in FIG. 7 to have second positions B, in which position these switches connect secondaries 404, 406 and 408, respectively, control electrode 200 through line 308. Thus, each switch 418, 420, and 422 is capable of electrically replacing or substituting a primary electrode 26, 28 and 30, respectively, with control electrode 200. Preferably, switches 418, 420 and 422 are moved sequentially from position A to position B and returned to position A at zero cross-over points of the current appearing in secondaries 404, 406, and 408. These cross-over points may be determined by cross-over point sensors 432, 434 and 436 which are electrically coupled to secondaries 402, 406, and 408, respectively.

The substitutions may last for as long as a single cycle, or for several cycles, depending upon the amount of current necessary to be diverted to control electrode 200 to maintain the desired temperature as detected by temperature sensor 320, and/or the desired rate of flow as detected by load cell 326. As additional current is required, the amount of substitution by switches 418, 420 and 422 is increased by control unit 424. When the input from load cell 326, and temperature sensor 320 indicate that less current is required, the amount of substitution by switches 418, 420, and 422 is decreased.

Additional control over the temperature adjacent orifice 16 is provided by the operation of motor 202. When additional temperature is required adjacent orifice 16, motor 202 may be operated by a signal from control unit 424 over line 324 to move surface 220 of control electrode 200 closer to orifice 16, and, in the converse, to move surface 220 further away when less temperature is required.

The control unit 424 is also coupled by line 442 to nozzle coolant valve 24, and by line 444 to vessel coolant valves 124. As stated before, nozzle coolant valve 24 controls the flow of coolant through cooling mechanism 22 of nozzle support assembly 20. More specifically, valve 24 controls the flow of fluid through pipes 66 and 70 in FIG. 2. Vessel coolant valves 124 are illustratively shown in FIGS. 4A and 4B as governing the flow of coolant allowed into chambers 112, 114, 116, and 118 of vessel 10. As will be explained below, the operation of nozzle coolant valve 24 permits the selective freezing of product in orifice 16 to close off and terminate the flow of product through nozzle 18, and the operation of vessel coolant valves 124 operate to help selectively position the pool of melted product adjacent orifice 16.

In operation, product to be melted, preferably minerals commonly referred to as fly ash, is introduced into vessel 10 through opening 14, in sufficient quantity to cover orifice 16, primary electrodes 26, 28 and 30, and control electrode 200. To begin the melting process, control electrode 200 is moved into a position whereby lower conductive surface 220 is immediately adjacent, but not touching, upper surface 44 of nozzle 18.

Electrical energy is thereafter supplied to primary electrodes 26, 28 and 30 through secondaries 404, 406 and 408. In addition, switches 418, 420, 422 are operated to provide time-sharing of the current supplied to primary electrodes 26, 28 and 30 with control electrode 200. The amount of time-sharing is increased until the temperature between lower surface 220 of control electrode 200 and upper surface 44 of nozzle 18 is sufficient to melt product adjacent orifice 16. As the melting process continues, nozzle control valve 24 is opened to provide coolant flow through pipes 66 and 70 of nozzle support assembly 20 sufficient to assure that the pool of melted product adjacent orifice 16 does not come in contact with nozzle support 20.

As the pool adjacent orifice 16 grows, conductive surface 220 of control electrode 200 may be withdrawn through operation of motor 202 from surface 44 of nozzle 18 and the amount of time-sharing by control electrode 200 may be reduced through the operation of switches 418, 420 and 422.

When the pool of melted product finally reaches conductive surfaces 182 of primary electrodes 26, 28 and 30, the operation of control electrode 200 may be temporarily suspended, and conductive surface 220 may even be moved even further from surface 44 of nozzle 18. When the conductive pool reaches conductive surfaces 182 of primary electrode 26, 28 and 30, a low current between the primary electrodes may maintain that pool in a melted state. If it is not desired to begin pouring operation, nozzle control valve 24 may be further opened to increase the cooling of nozzle support assembly 20, and thereby solidified melted product in passage 46 of nozzle 18 to plug nozzle 18 and prohibit additional flow of product from the melted pool through nozzle 18.

Thereafter, a pour operation may begin by moving control electrode 200 back toward nozzle 18, until conductive surface 220 of control electrode 200 is again immediately adjacent, but not touching, upper surface 44 of nozzle 18. The time-sharing process then commences, within time-sharing of current from secondaries 404, 406, and 408 with control electrode 200, until the intensity of current between control electrode 200 and nozzle 18 is sufficient to melt out the plug which had been formed in channel 46 of nozzle 18. Thereafter, conductive surface 220 of control electrode 200 is once again moved back from upper surface 44 of nozzle 18, but preferably remains at a position clearly closer to orifice 16 than any of primary electrodes 26, 28 or 30. For example if passage 46 has an internal diameter of approximately two and one-half inches, conductive surface 220 is ideally positioned on the order of one-half of an inch above upper surface 44 in order to accomplish melting of product solidified in channel 46, and is thereafter preferably positioned anywhere between one-half to three inches above surface 44 depending upon the desired pour rate, the conductivity of the product to be melted, the amount of current supplied by secondaries 404, 406 and 408, and the amount of time-sharing provided by switches 418, 420, and 422.

Measurement by load cell 326 indicates a continuous weight of vessel 10 and product 12. With a known fixed amount of product 12 being continuously added to vessel 10, for example 40,000 lbs per hour, a rate of flow of product through orifice 16 less than 40,000 lbs per hour will be evidenced by an increase in the reading of load cell 326, and a pour rate of greater than 40,000 lbs per hour will be indicated by load cell 326 as a decrease in the overall weight of vessel 10 and product 12. Control circuit 300 must be set up to either increase the amount of time-sharing by control electrode 200 and/or decrease the amount of distance between conductive surface 220 of control electrode 200 and orifice 16 in the event load cell 326 indicates that the pour rate must be increased. A converse operation must occur through the operation of control circuit 300 in the event load cell 326 indicates that the pour rate must be decreased.

Similarly, temperature of melted product passing through the orifice 16 is detected by temperature sensor 326, and used to control the operation of control circuit 300.

Furthermore, the temperature of coolant passing through compartments 112, 114, 116, and 118 of vessel 10 may be continuously detected to determine the location of the melted pool formed by electrodes 26, 28 and 30. If, for example, the temperature of coolant exiting the compartment 114 on the extreme left-hand side of vessel 10 is warmer than the coolant exiting the compartment 118 on the right-hand side of vessel 10, this indicates that the pool of melted product is not directly centered over orifice 16, and instead has shifted to the left. To control the shift of the position of the pool of melted product, vessel cooling valves 426 are reset to increase the relative flow of coolant through the left-hand quadrant of vessel 10, and thereby shift the pool of melted product back into a centered position over orifice 16.

Accordingly, the present invention provides apparatus and methods for definitively controlling the temperature of product immediately adjacent a product exit orifice of a vessel, the flow rate of product passing through that orifice, and the position of a pool of melted product surrounding that orifice.

Additional advantages and modifications will readily occur to those skilled in the art. The invention in its broader aspects is therefore not limited to the specific details, representative apparatus, an illustrative example shown and described. Accordingly, departures may be made from such details without departing from the spirit or scope of applicant's general inventive concept.

I claim:

1. A melting furnace comprising:
   (a) a vessel for receiving product to be melted, said vessel having means for defining a product exit orifice;
   (b) a plurality of primary electrode means for defining primary current paths adjacent said orifice;
   (c) control electrode means for defining a current path to said means for defining; and
   (d) circuit means for energizing said primary electrode means with multiphase current and for time-sharing said multiphase current with said control electrode means.

2. The furnace of claim 1 wherein said vessel includes a nozzle which defines said product exit orifice, said nozzle having an upper surface which contains said orifice, a channel having a smaller internal diameter than said orifice which channel extends through said nozzle, and a conical indent on said upper surface which couples said orifice to said channel.

3. The furnace of claim 2, wherein said nozzle further includes a lower surface, said lower surface opposite said upper surface having an opening to said channel, said opening being surrounded by a convex protuberance of said lower surface.

4. A melting furnace comprising:
   (a) a vessel for receiving product to be melted, said vessel having a nozzle which defines a product exit orifice;
   (b) a plurality of primary electrode means for defining primary current paths adjacent said orifice;
   (c) control electrode means for defining a current path to said orifice; and
   (d) circuit means for energizing said primary electrode means with multiphase current, for time-sharing said multiphase current with said control electrode means, and for providing a return current path of said multiphase current through said nozzle.

5. The furnace of claim 1 or 4 wherein said circuit means includes means for varying said time-sharing in response to the temperature of product passing through said orifice.

6. The furnace of claim 1 or 4 wherein said circuit means includes means for varying said time-sharing in response to the rate of flow of product through said orifice.

7. The furnace of claim 1 or 4 wherein said circuit means sequentially replaces each primary electrode means electronically with said control electrode means.

8. A melting furnace comprising:
   (a) a vessel for receiving product to be melted, said vessel having a nozzle which contains an upper surface, and a product exit orifice in said upper surface through which melted product may pass out of said vessel;
   (b) first, second and third primary electrode means for defining primary current paths between said electrode means to heat product adjacent said orifice, said primary current paths and orifice lying in the same plane;
   (c) control electrode means having an electrically conductive surface located within said vessel on a line which is both perpendicular to said plane and passes through said orifice, said electrically conductive surface of said control electrode means being moveable along said line; and
   (d) circuit means for sequentially replacing each primary electrode means electronically with said control electrode means.

9. The furnace of claim 8 wherein said circuit means includes means for controlling the replacement of each primary electrode in response to the temperature of product passing through said orifice.

10. The furnace of claim 1, 4 or 8 wherein said circuit means includes means for altering the position of said control electrode means in response to the temperature of product passing through said orifice.

11. The furnace of claim 8 wherein said circuit means includes means for controlling the replacement of each primary electrode in response to the rate of flow of product through said orifice.

12. The furnace of claim 1, 4 or 8 wherein said circuit means includes means for altering the position of said control electrode in response to the rate of low of product through said orifice.

13. The furnace of claim 1, 4 or 8 wherein said vessel includes cooling means for altering the position of melted product adjacent said orifice.

14. The furnace of claim 13 wherein said cooling means includes inner and outer side walls forming said vessel and a plurality of coolant flow means in said side walls for cooling selective portions of said side walls of said vessel.

15. The furnace of claim 14 wherein said coolant flow means are positioned vertically adjacent one another in said side walls of said vessel.

16. The furnace of claim 1, 4 or 8 wherein said primary electrode means each have a convex-shaped electrically conductive surface located within said vessel, positioned to tend to equalize the length of said primary current paths between adjacent primary electrode means.

17. A method for controlling the melting of product in a vessel having a nozzle which defines a product exit orifice, a plurality of primary electrodes which define primary current paths adjacent said orifice, and a moveable electrode, comprising the steps of:
(a) energizing said primary electrodes with sufficient multiphase current to maintain a pool of melted product adjacent said orifice;
(b) positioning said moveable electrode closer to said orifice than any of said primary electrodes; and
(c) sequentially replacing each primary electrode electronically with said moveable electrode.

18. The method of claim 17 further including the step of regulating the replacement of each primary electrode in accordance with the temperature of product passing through said orifice.

19. The method of claim 17 or 18 further including the step of varying the positioning of said moveable electrode in response to the temperature of product passing through said orifice.

20. The method of claim 17 further including the step of regulating the replacement of each primary electrode in accordance with the rate of flow of product through said orifice.

21. The method of claim 17 or 20 further including the step of controlling the positioning of said moveable electrode in response to the rate of flow of product through said orifice.

22. The method of claim 17 further including the step of melting solidified product in the orifice of said nozzle by moving said moveable electrode adjacent to said orifice, and applying electrical current between said moveable electrode and said nozzle sufficient to melt said product in said nozzle.

23. The method of claim 17 further including the step of terminating the flow of melted product through said orifice by withdrawing said moveable electrode from the vicinity of said orifice.

24. The method of claim 23 further including the step of providing coolant flow adjacent said nozzle.

* * * * *

UNITED STATES PATENT AND TRADEMARK OFFICE
CERTIFICATE OF CORRECTION

PATENT NO. : 4,399,544
DATED : August 16, 1983
INVENTOR(S) : GEORGE J. MONAGHAN

It is certified that error appears in the above—identified patent and that said Letters Patent is hereby corrected as shown below:

On the Face Sheet under [56] References Cited, U.S. PATENT DOCUMENTS, After 2,961,698 11/1960 Rea, add--

| | | |
|---|---|---|
| 3,147,328 | 9/1964 | LeClerc de Bussy |
| 3,192,302 | 6/1965 | Keefer |
| 3,659,029 | 4/1972 | LeClerc de Bussy |
| 3,876,817 | 4/1975 | LeClerc de Bussy |
| 3,983,309 | 9/1976 | Faulkner et al. |
| 4,087,267 | 5/1978 | Groutte et al. |
| 4,120,676 | 10/1978 | Hahn et al. |
| 3,580,976 | 5/1971 | LeClerc de Bussy |
| 4,017,294 | 4/1977 | Sanford et al. |
| 3,109,045 | 10/1963 | Silverman |
| 2,186,718 | 1/1940 | Ferguson |

Signed and Sealed this

Fifteenth Day of November 1983

[SEAL]

Attest:

GERALD J. MOSSINGHOFF

Attesting Officer

*Commissioner of Patents and Trademarks*